R. G. WILSON.
EGG MIXER.
APPLICATION FILED FEB. 5, 1920.
1,353,443.
Patented Sept. 21, 1920.
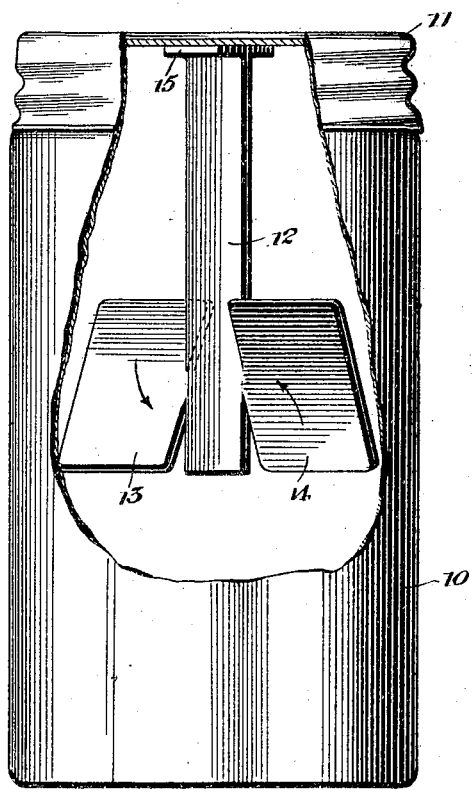
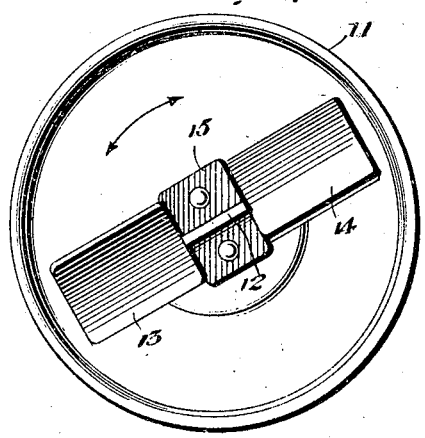
WITNESSES
R E Rousseau
INVENTOR
R. G. Wilson,
BY
Munn & Co.
ATTORNEYS

UNITED STATES PATENT OFFICE.

ROBERT GROUT WILSON, OF DAVIS, WEST VIRGINIA.

EGG-MIXER.

1,353,443.  Specification of Letters Patent.  Patented Sept. 21, 1920.

Application filed February 5, 1920. Serial No. 356,535.

*To all whom it may concern:*

Be it known that I, ROBERT G. WILSON, a citizen of the United States, and a resident of Davis, in the county of Tucker and State of West Virginia, have invented certain new and useful Improvements in Egg-Mixers, of which the following is a specification.

My present invention relates generally to mixers, and more particularly to a portable hand mixer for domestic use in mixing fluids or semi-fluids, my object being the provision of a simple inexpensive apparatus which may be readily cleansed after using and thus maintained in highly sanitary condition.

In the accompanying drawing which illustrates my present invention and forms a part of this specification, Figure 1 is a side view, the container and its cover being partly broken away, and, Fig. 2 is a bottom plan view of the cover with its stem and mixing wings removed.

Referring now to these figures my invention proposes a mixer including a cylindrical container generally indicated at 10, and which may be of glass or any other suitable material, closed at one end and adapted at its opposite end to receive a removable cover 11, the latter of which is in the present instance shown as a screw cap.

Within the container 10 which is thus adapted for the reception of the fluids or semi-fluids to be mixed, by simply removing the cover 11, extends an axial stem 12 provided with laterally projecting wings 13 and 14, at opposite sides thereof, and inclined with respect to the stem in relatively opposite directions.

This stem 12 is secured at one end to the center of the cap or cover 11 as indicated at 15 and is thus removable from the container when the cover is removed so that the stem and its wings may be readily cleansed and, without trouble, maintained in a highly sanitary condition at all times.

In the present instance I have shown the wings formed at the free end of the stem 12, by slitting side sections of the material of the stem and oppositely twisting the side sections after slitting, and while this precise formation is not essential in carrying out my invention, the wings, whatever their particular formation, will be located approximately midway of the length of the container 10 so that as the latter is grasped and shaken in the direction of its longitudinal axis, the fluids or semi-fluids will be deflected in relatively opposite directions upon movement either way and thus in addition to their lengthwise movement, a more or less circular motion will be imparted thereto and a thorough intermingling and mixing induced.

I claim:

An egg mixer consisting of a container, a removable cover therefor having means to position the same in immovable relation with the container, and an axial stem projecting from the cover within the container having a pair of side wings integral therewith adjacent to its free end and positioned approximately in the center of the container, said side wings having their inner and outer portions separated from the stem by slits and being positioned at oppositely inclined angles with respect to the longitudinal axis of the stem and with their inner and outer portions projecting upon relatively opposite sides of the stem.

ROBERT GROUT WILSON.